Oct. 18, 1938. M. NIEMI 2,133,632

SPEED RECORDING MECHANISM

Filed July 14, 1936 2 Sheets-Sheet 2

INVENTOR.
Matti Niemi
BY
ATTORNEYS.

Patented Oct. 18, 1938

2,133,632

UNITED STATES PATENT OFFICE 2,133,632

SPEED-RECORDING MECHANISM

Matti Niemi, Seattle, Wash.

Application July 14, 1936, Serial No. 90,533

8 Claims. (Cl. 234—33)

This invention relates to a speed recorder for use on automobiles or other vehicles of which a record of the speed is desired.

The invention has as a primary object the provision of mechanism operated intermittently at predetermined intervals whereby means on which a record of the speed is made may be utilized over appreciably greater distances of vehicle travel than is the case with prior developments wherein continuous recording is carried on.

In performing the referred-to intermittent recording of speed I desirably employ means acting to perforate the record-receiving member to obtain a permanent record incapable of being altered, and in most advantageously performing such intermittent perforation the invention has as a further object the provision of devices acting to prevent fluctuation of the speed-indicating parts during a speed-recording operation.

Other objects and advantages looking toward simplification and perfection of mechanism for recording vehicle speed will, together with the foregoing, become apparent in the course of the following detailed description and claims, the invention consisting in the novel construction, adaptation, and combination of parts hereinafter described and claimed.

In the drawings:—

Figure 2:
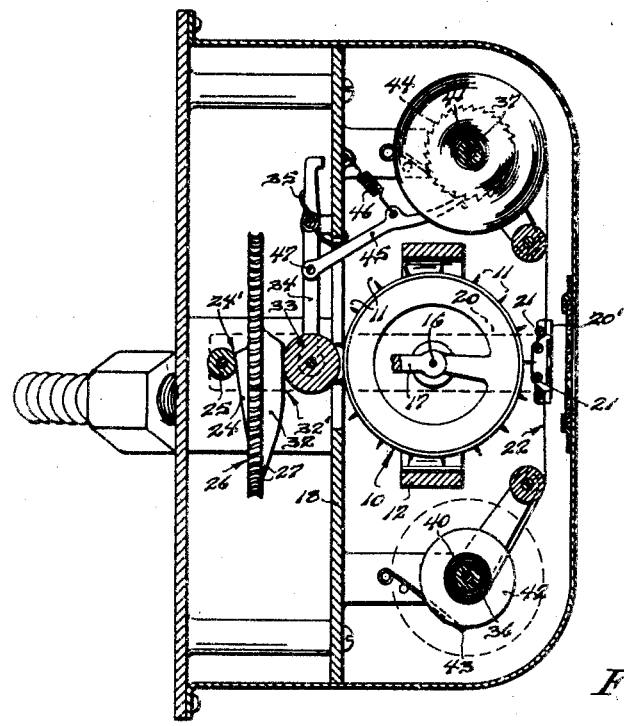
Fig. 2 is a horizontal section thereof taken on the line 2—2 of Fig. 1.
Figure 1:
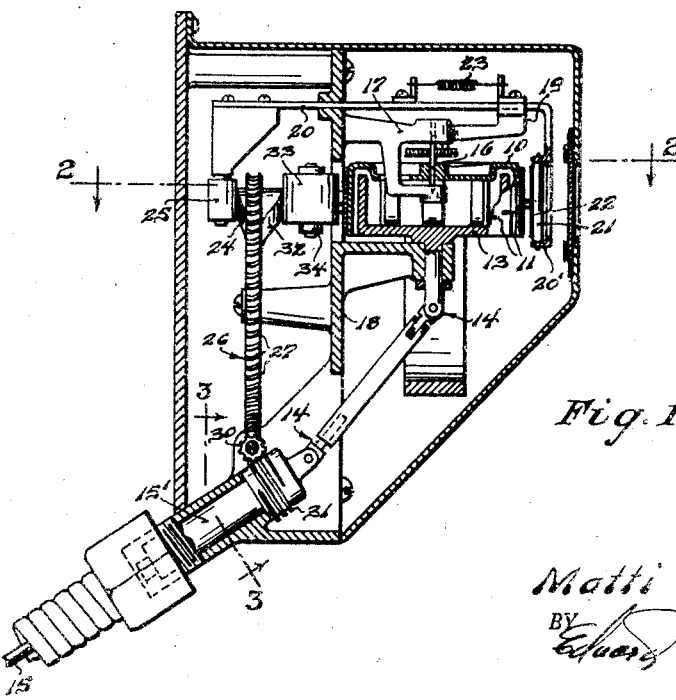
Figure 1 is a longitudinal vertical section illustrating the now preferred embodiment of the present invention as applied to a drive cable revoluble according to the speed of the vehicle.
Figure 3:
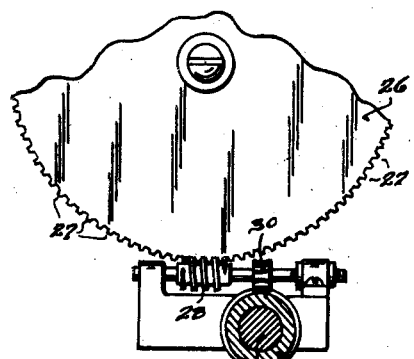
Fig. 3 is an enlarged detail view taken on the line 3—3 of Fig. 1 representing reduction gearing connecting the drive cable with a revoluble disc used to operate the speed-recording structure intermittently.
Figure 4:
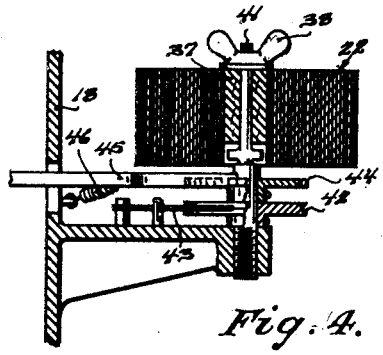
Fig. 4 is an enlarged detail sectional view indicating the spool and related drive structure therefor on which a record-receiving tape is wound.
Figure 5:
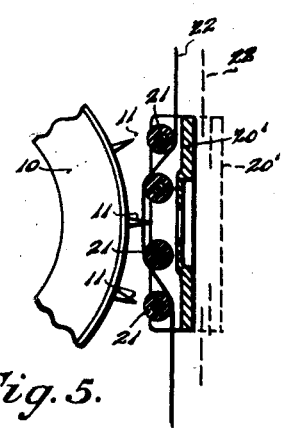
Fig. 5 is an enlarged detail view of the speed-indicating drum and related supporting means for the tape to position the latter in record-receiving position, dotted lines indicating the normal location of the tape-supporting means.
Figure 6:
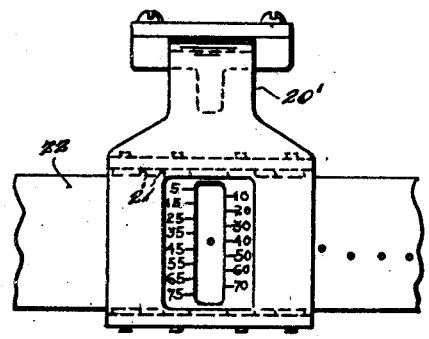
Fig. 6 is a top plan view of the structure illustrated in Fig. 5.
Figure 7:
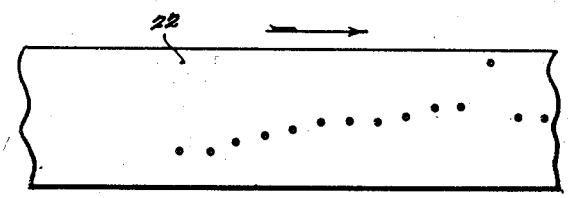
Fig. 7 is a fragmentary view illustrating a detached portion of the tape with a speed record provided thereon.

While it is to be understood that the recording mechanism which I have devised permits assembly in a single casing with speed measuring and indicating mechanism of well known or suitable construction I have, for purposes of simplicity in illustration, indicated the recording mechanism as being employed with speed measuring structure alone.

According to the present invention, a speed-governed drum designated by the numeral 10 is employed which is or may be similar to that conventionally used in speed-indicating devices for automotive vehicles excepting, however, that a plurality of pins 11 used to perforate the tape are mounted in radial positions circumferentially about the drum rim. The drum is represented as being of that character employed most generally in vehicle-speedometer constructions such, for example, as the "Stewart-Warner" product wherein the drum is torsionally actuated by a magnet 12 under the influence of a rotor 13 which is coupled for direct drive through universals 14 with the operating cable 15, the cable being ordinarily driven from the torque shaft of the vehicle. Said tape-perforating pins lie in regularly spaced relation spirally about the drum periphery and desirably are successively spaced at intervals representing five miles in torsionally effected speed indications of the drum.

Supporting said drum for torsional movement is a needle-type pin 16 journaled in bearings therefor carried by bracket arms 17 rigid with a frame 18. Said frame in co-operation with a bracket extension 19 also supports a member 20 of an L-configuration to accommodate slide movement of the member in a horizontal plane above the drum, one arm 20' of the same serving to carry the tape to position the latter in overlying relation to the drum rim. Constituting a tape support, said arm 20' is provided with a series of parallel transversely journaled rollers 21 which lie in pairs at each side of the drum's diametrical center line, the tape being threaded through the rollers by passing the same over and then under the related rollers of each pair. The tape is denoted by 22.

Normally lying exteriorly of the perimetrical limits of the pins 11, through the action of a spring 23 engaging the member 20, the tape is intermittently operated into engagement with a speed-positioned pin by a rotary cam 24 which acts to engage a roller 25 carried at the opposite end of the member 20, said cam being mounted on the outer face of a disc 26 which is supported for revoluble movement about a horizontal axis and driven from the driving cable 15 by reduction gearing such, for example, as a worm 28 meshing peripheral teeth 27 formed on the disc and driven by a worm wheel 30 which is in turn driven by a worm 31 fast to a shaft 15' fixed to the cable. Also carried by said disc to lie on the opposite or drum-facing side is a cam 32 acting upon a steel roller 33 carried between the free ends of parallel lever arms 34 for movement into and from engagement with the drum at a point diametrically opposite from the tape-supporting arm of the member 20. In the manner represented, the roller 33 is actuated by cam 32 into the space between two of the pins 11 and performs the double function of intermittently securing the drum against movement in speed-determined positions and slightly modifying the speed-determined position, where required, to locate the tape-perforating pin in a plane common to the median line of the tape-supporting head of the sliding arm 20'. It is to be noted that the cam-influenced revoluble movement of the roller 33 most effectively deflects a pin laterally where the same lies centrally of the roller. The slight variation as between actual speed and the recorded point at which perforation is made is of no moment as the invention is designed to obtain a record of excessive speeds. This variation, moreover, may be reduced to mile fractions by proportionate increase in the number of pins employed about the periphery of the drum. The cam 32 for said roller 33 is formed with a flattened peak 32' overlapping the peak 24' of the cam 24. 35 indicates a spring acting upon the lever arms 34 to retract the roller from drum engagement.

Acting as supply and receiving reels for the tape are spools 36 and 37 secured by means of wing nuts 38 to spindles 40 and 41 lying at each side of the drum, the spindles desirably providing key-forming wings which fit slots in the spools to allow ready attachment and detachment. Revoluble with the respective spindles are brake sheaves 42 in the grooves of which spring wires 43 seat to yieldably resist spindle movement, the spindle 41 being operated by a ratchet wheel 44 from a ratchet lever 45 which is pivotally connected, as at 47, with the levers 34. A light coil spring 46 influences the ratchet into engagement with the teeth of the ratchet wheel, the arrangement providing intermittent tape travel in advance of each recording operation.

The gear reduction which I provide between cable 15 and disc 26 desirably acts to transmit one complete revolution to the latter during each quarter-mile of vehicle travel, thereby obtaining a record of the vehicle speed at sufficiently close intervals of travel to accurately determine, in the event of accident or for such other reason as may be presented, the particular manner in which the vehicle has been driven. Through the intermittent recording, a single roll of tape serves as a speed record throughout a protracted period of time under normal conditions of vehicle travel. Previously devised speed-recording mechanisms wherein the speed is registered continuously upon a chart or tape, requiring renewal at frequent intervals, are opposed not only by the reckless driver but by the careful driver due to the necessity of surrendering his vehicle at short intervals. The present invention permits continuous use of a roll, which may be changed only by authorized parties without hardship upon the owner, in excess of 10,000 miles of travel.

I have illustrated the tape-supporting arm 20' as being provided with a reading scale which is or may be visible through a glass-covered opening in the casing of the mechanism. With the perforations occurring at spaced intervals in terms of vehicle travel, it is not necessary that the tape be marked for distance. Perforation of the tape, as distinguished from other means of marking the same, is preferred as providing a permanent and readily distinguishable record incapable of being altered.

The invention is believed clear and it is my intention that no limitations be implied other than as expressly set forth in the hereto annexed claims.

What I claim, is:—

1. A speed-recording mechanism for vehicles comprising, in combination, a record-receiving tape, a torsionally-movable drum actuated relatively with the speed of travel of the vehicle and provided about its periphery with tape-marking means located equidistantly in a helical arrangement, a tape-carrying means movable directively to and from the periphery of said drum to actuate the tape into and from position whereat the same is marked by a speed-positioned marking means, means for operating said tape-carrying means periodically, and means for advancing the tape relative to the tape-carrying means in the successive intervals between said periodic movements of the latter.

2. The mechanism as defined in claim 1 and means acting to momentarily hold the drum against torsional movement co-incident with the movement of the tape into marking relation to a speed-positioned marking means of the drum.

3. A speed-recording mechanism for vehicles comprising the combination of a record-receiving tape, a speed-governed torsionally-movable drum provided about its periphery with equi-distant radially extending and helically arranged tape-perforating pins, rotary means driven at a speed proportional to the torsional movement of the drum, and means actuated by said rotary means for performing the following operations in each rotary cycle thereof, viz: momentarily securing the drum against torsional deflection and, simultaneously therewith, advancing and retracting the tape into and from a position in the path of torsional movement of the pins to penetrate the tape by a speed-positioned pin of the drum, and feeding the tape, said feeding operation being performed in the interval between successive movements of the tape into engagement with the speed-positioned pins.

4. Mechanism for recording vehicle speed comprising the combination of a record-receiving tape, a speed-governed torsionally movable drum provided about its periphery with spaced radially extending and helically-arranged tape-perforating pins, means mounted for reciprocatory travel in a fixed radial plane of the drum and acting to carry the tape for actuating the tape into and from a position in the path of torsional movement of the pins whereat the tape is penetrated by a speed-positioned pin, and rotary means driven at a speed proportional to the torsional movement of the drum for performing, in each rotary cycle thereof, the following operations: momentarily securing the drum against torsional movement and simultaneously actuating the tape-carrying means into and from position whereat the tape is penetrated by a speed-positioned pin; releasing the drum; and feeding the tape relative to the tape-carrying means to advance the portion thereof previously penetrated by the pin.

5. Mechanism for recording vehicle speed comprising, in combination with a record-receiving tape, a speed-governed torsionally movable drum provided about its periphery with spaced radially disposed and helically arranged tape-perforating pins, a supply and a receiving spool for the tape, tape-carrying means receiving the tape in its passage from the supply to the receiving spool and movable in a fixed radial plane of the drum to carry the tape into and from the path of torsional movement of the pins whereby the tape is penetrated by a speed-positioned pin, and a rotary disk driven at a speed proportional to the torsional movement of the drum and acting periodically to transmit drive movement to the receiving spool for advancing the tape and to actuate the tape-carrying means into position whereat the tape is penetrated by a speed-positioned pin, said disk also acting to momentarily secure the drum against torsional movement co-incident with the movement of the tape into the path of torsional movement of the pins.

6. The mechanism as defined in claim 5 wherein cams on said disk co-act with rollers operatively connected with the receiving spool, the tape-carrying means, and the drum to perform the described operations.

7. A speed-recording mechanism for vehicles comprising the combination of a speed-governed torsionally-movable drum provided about its periphery with tape-marking means located equidistantly in a helical arrangement, a record-receiving tape associated therewith, means whereby recordings are made on said tape from a speed-positioned marker of the tape-marking means at fixed distance-spaced intervals during vehicle travel, and means for advancing the tape in the successive intervals between said periodic recording actions.

8. A speed-recording mechanism for vehicles comprising the combination of a speed-governed torsionally-movable drum provided about its periphery with tape-marking means located equidistantly in a helical arrangement, a record-receiving tape associated therewith, and means whereby recordings are made on said tape from the drum indicating vehicle speed at fixed distance-spaced intervals during vehicle travel.

MATTI NIEMI.